(12) United States Patent
Mason et al.

(10) Patent No.: US 10,145,214 B2
(45) Date of Patent: Dec. 4, 2018

(54) ENERGY STORAGE SYSTEM

(75) Inventors: Guy Harvey Mason, Hampshire (GB); Steven Bill Ellenby, Hampshire (GB); Keith Robert Wootten, Hampshire (GB)

(73) Assignee: SONDEX WIRELINE LIMITED, Hampshire (GB)

( * ) Notice: Subject to any disclaimer, the term of this patent is extended or adjusted under 35 U.S.C. 154(b) by 940 days.

(21) Appl. No.: 13/558,600

(22) Filed: Jul. 26, 2012

(65) Prior Publication Data
US 2013/0029241 A1 Jan. 31, 2013

(30) Foreign Application Priority Data
Jul. 29, 2011 (GB) .................................. 1113068.9

(51) Int. Cl.
*H01M 8/04* (2016.01)
*E21B 41/00* (2006.01)
*H01M 6/36* (2006.01)
*G01V 11/00* (2006.01)
*H01M 14/00* (2006.01)
*H01M 10/615* (2014.01)
*H01M 10/653* (2014.01)
(Continued)

(52) U.S. Cl.
CPC ........ *E21B 41/0085* (2013.01); *G01V 11/002* (2013.01); *H01M 6/36* (2013.01); *H01M 10/615* (2015.04); *H01M 10/653* (2015.04); *H01M 10/658* (2015.04); *H01M 10/667* (2015.04); *H01M 14/00* (2013.01); *H01M 6/34* (2013.01); *H01M 8/04* (2013.01); *H01M 10/39* (2013.01)

(58) Field of Classification Search
CPC ....................................................... H01M 8/04
See application file for complete search history.

(56) References Cited

U.S. PATENT DOCUMENTS 4,416,000 A * 11/1983 Scherbatskoy ................. 367/81
7,258,169 B2    8/2007 Fripp et al.
(Continued)

FOREIGN PATENT DOCUMENTS

EP        1577548 A1    9/2005
GB        2009473 A     6/1979
(Continued)

OTHER PUBLICATIONS

Second Office Action for CN201210263239,Nth_Office_Action_(Translated),May 17, 2016.*
(Continued)

*Primary Examiner* — Alexander Usyatinsky
(74) *Attorney, Agent, or Firm* — Global Patent Operation

(57) ABSTRACT

An energy storage system is disclosed. The energy storage system comprises an energy storage device configured to operate above ambient temperature, and a thermal insulator at least partially surrounding the energy storage device, wherein heat losses from one or more other devices are received within the thermal insulator to provide heat energy to the energy storage device. Utilizing heat losses from one or more other devices, such as associated electronic components, enables the energy storage device to be maintained at its elevated operational temperature for longer providing extended battery life. In the application of wireline logging, this results in more data log available per trip in a well.

18 Claims, 2 Drawing Sheets

(51) Int. Cl.
*H01M 10/667* (2014.01)
*H01M 10/658* (2014.01)
H01M 10/39 (2006.01)
H01M 6/34 (2006.01)

(56) References Cited

U.S. PATENT DOCUMENTS

| | | | |
|---|---|---|---|
| 7,717,167 | B2 | 5/2010 | Storm et al. |
| 2005/0211436 | A1* | 9/2005 | Fripp et al. .................... 166/302 |
| 2005/0242782 | A1 | 11/2005 | Kadouchi et al. |
| 2006/0191682 | A1 | 8/2006 | Storm et al. |
| 2006/0191687 | A1* | 8/2006 | Storm ..................... E21B 36/00 166/302 |
| 2008/0292495 | A1 | 11/2008 | Frechen et al. |
| 2008/0292945 | A1* | 11/2008 | Kumar et al. ................. 429/52 |
| 2010/0330403 | A1* | 12/2010 | Normann ....................... 429/62 |
| 2011/0076542 | A1 | 3/2011 | Farmer |

FOREIGN PATENT DOCUMENTS

| | | |
|---|---|---|
| GB | 2234625 A | 6/1991 |
| WO | 2010107833 A2 | 9/2010 |

OTHER PUBLICATIONS

Search Report from corresponding GB application No. 1113068.9, dated Nov. 10, 2011.
Unofficial English translation of Office Action issued in connection with corresponding CN Application No. 201210263239.9 dated Oct. 10, 2015.

\* cited by examiner

ENERGY STORAGE SYSTEM

BACKGROUND OF THE INVENTION

Embodiments of the present invention relate to an energy storage system, in particular to an energy storage system arranged to operate at elevated temperatures.

Wellbores are generally drilled to extract natural resources such as crude oil and gas. Downhole electrical equipment is used in wellbores for various purposes, such as for sensors to measure downhole conditions, to power data storage and transmission functions and to power downhole tools and valves. Such downhole electrical equipment can be powered by energy storage devices such as batteries, fuel cells or capacitors.

Many types of energy storage devices, such as NaCl batteries and fuel cells, only operate at higher temperatures. However, the operating temperatures range for many energy storage devices is above even the temperatures encountered downhole, which may, for example be 180° C. or above.

U.S. Pat. No. 4,416,000 discloses an arrangement to "start up" a battery before it is immersed into a hot environment of an oil well. Initially an external voltage is applied to the instrument while at the surface before immersion into the oil well. This voltage activates heating elements which melt the electrolyte of a molten salt battery. A thermostatic switch is provided so that when downhole, the battery can supply power to a heating element when the battery requires additional heat.

Such batteries are generally used downhole until they have run out of charge and they then have to be removed with the entire downhole arrangement on which they are provided. It would be desirable to extend the period of time that an energy storage device can be used downhole to reduce operational interruptions in which the entire downhole arrangement has to be retrieved, the energy storage device recharged or replaced and passed downhole again.

BRIEF DESCRIPTION OF THE INVENTION

According to an embodiment of the present invention, there is provided an energy storage system. The energy storage system comprises an energy storage device configured to operate above surrounding ambient temperature, and a thermal insulator at least partially surrounding the energy storage device, wherein heat losses from one or more other devices are a configured to be received within the thermal insulator to provide heat energy to the energy storage device As heat losses from one or more other devices are received within the thermal insulator, this keeps the temperature of the energy storage device higher for longer periods of time. This reduces the power required to maintain the temperature of the storage device and hence the drain on the device enabling it to carry on operating downhole for longer and reducing the number of times that operations must be suspended for tools and the energy storage device to be removed from a well. In the application of wireline logging, this results in more data log available per trip in the well.

The one or more other devices may also be at least partially surrounded by the thermal insulator for good thermal transfer of heat losses or energy to the energy storage device.

The one or more other devices may be or include one or more electronic components, such as transistors. The electronic components may be or form part of a control circuit for controlling heating of the energy storage device using one or more electric heaters. The electronic components may be arranged to operate above ambient temperatures and may comprise SiC based components which can operate at elevated temperatures, such as 300° C. and above.

BRIEF DESCRIPTION OF THE DRAWINGS

Embodiments of the present invention will now be described, by way of example only, with reference to the accompanying drawings, in which.

DETAILED DESCRIPTION OF THE EXEMPLARY EMBODIMENTS OF THE INVENTION

Figure 1:
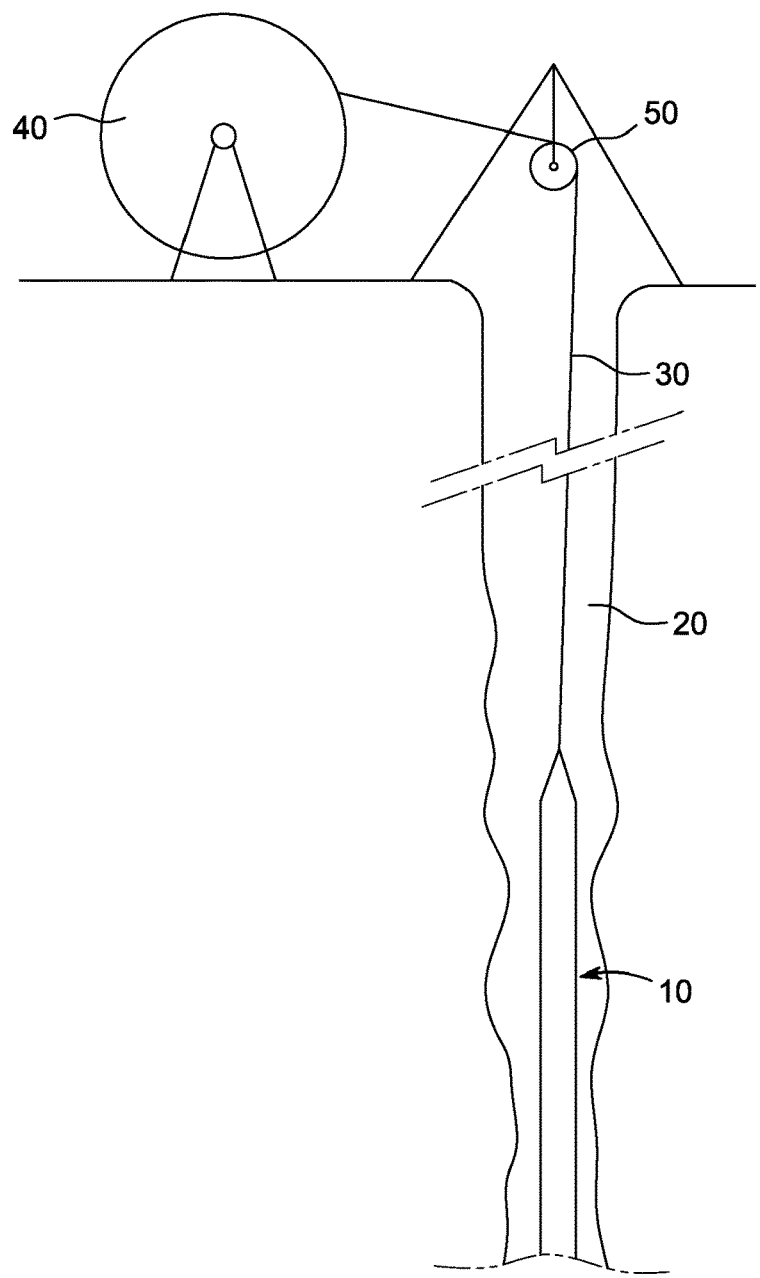
FIG. 1 illustrates a downhole unit located in a wellbore.

FIG. 1 illustrates a downhole unit 10 located in the borehole 20 of a well. The downhole unit 10 is suspended from a wireline 30 fed from a drum 40 via a pulley 50 provided at the surface. The downhole unit 10 may be used for various purposes, such as for drilling, measuring downhole conditions etc. The downhole unit 10 in this embodiment has an energy storage device, such as one or more batteries, fuel cells or capacitors which may be used to power downhole electrical equipment such as sensors, tools and valves and/or power data storage and transmission equipment.

Figure 2:
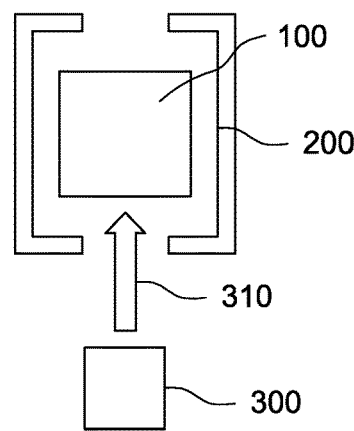
FIG. 2 shows an energy storage system illustrating an embodiment of the present invention.

FIG. 2 shows an embodiment of an energy storage system which may be provided in the downhole unit 10. The energy storage system includes an energy storage device 100 such as one or more batteries, a fuel cell or a capacitor or a combination thereof. One embodiment of an energy storage device 100 which is particularly suitable is a thermal or thermally activated battery in which the electrolyte is solid and inactive at normal surface ambient temperatures. At higher temperatures, such as in excess of 270° C. for sodium based batteries, the electrolyte is melted enabling the battery to operate. Elevated operating temperatures typically above 270° C. but more preferably above 300° C. or 400° C. are generally required. Thermal batteries generally offer higher energy density and higher power density than conventional batteries and have been found to be particularly suitable for use downhole where, as explained above, temperatures are higher than at the surface. Examples of thermal batteries include NaCl or molten salt batteries, sodium-sulphur batteries, lithium sulphur batteries, sodium aluminium chloride batteries and potassium-ion batteries. The energy storage device 100 is at least partially surrounded by a thermal insulator 200 to reduce heat losses from the energy storage device 100. An example of a suitable thermal insulator is a Dewar flask, but any suitable thermal insulator may be used depending on the required conditions, such as expected levels of vibration, size of energy storage device 100 required etc. One or more other devices 300 which generate heat losses, such as for example electronic components, parts of a drilling system, a braking system etc. are arranged such that the heat losses are received 310 within the thermal insulator 200 to provide heat energy to the energy storage device 100. The salvaging of this waste heat enables the energy storage device 100 to stay at its required temperature for longer, providing longer operational periods and reducing the frequency with which the downhole unit 10 has to be pulled up to the surface for the energy storage device 100 to be recharged or replaced. The increased operating time of the energy storage system of an embodiment of the present invention reduces operating costs and enables operations to be completed with less interruptions that reduce overall operation times.

Figure 3:
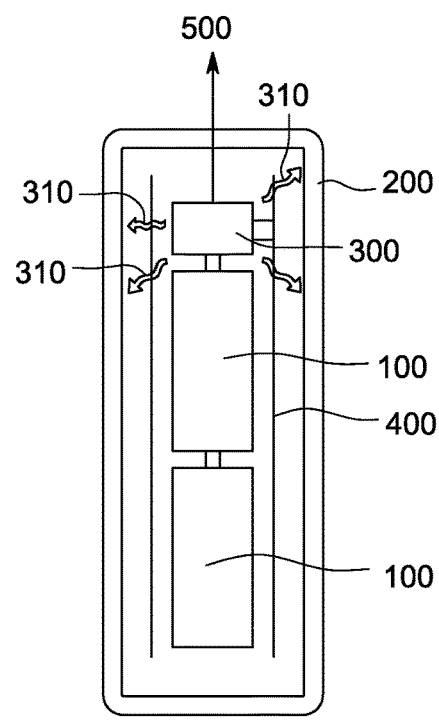
FIG. 3 shows an embodiment of the present invention.

FIG. 3 shows a more detailed illustration of an energy storage system of an embodiment of the present invention. In this embodiment, two interconnected energy storage devices 100 are provided. However, any number of one or more energy storage devices 100 may be used as is suitable for the desired application. The energy storage devices 100 are connected to an electronic circuit 300. In this embodiment the electronic circuit 300 is also provided within the thermal insulator 200. In this embodiment the electronic circuit 300 is a power supply unit. Any suitable type of power supply unit may be used, such as a linear power supply or a switch mode power supply. Linear power supplies are simpler but less efficient than switch mode power supplies. However, as the waste heat is salvaged to maintain the temperature of the storage device 100, they may be preferable. If using a different type of electronic circuit in which some components, such as transistors are able to operate at higher temperatures and generate more heat than other parts of the circuit, then the greater heat generating components may be provided at least partially within the thermal insulator 200 with the other components which may be less well able to operate at higher temperatures provided outside the thermal insulator 200 at a lower temperature. As schematically illustrated by arrows 310, heat losses from the device 300 are constrained within the thermal insulator 200 providing heat energy to the energy storage device 100.

In this embodiment the electronic circuit 300 is also connected to a heating element 400. If the temperature of the energy storage device 100 starts to fall below a lower threshold temperature, energy from the energy storage device 100 may be used to power the electric heating element 400 to restore the energy storage device 100 into a preferred operating temperature range. However, the use of energy from the energy storage device 100 to power the electric heater 400 reduces the amount of energy available for other operations via output 500, such as operating sensors, tools and valves and powering data storage and transmission equipment. Use of the heat losses from the device 300 reduces the amount of energy required to power electric heaters 400 to maintain the energy storage device 100 within its preferred operating temperature range, thus extending the life of the energy storage device 100. It has been found that use of a silicon carbide (SiC) based semiconductor electronic device 300 enables it to operate at higher temperatures than conventional silicon based electronics, such as at 300° C. and above. Thus, an embodiment of the present invention includes a SiC based electronic device 300 which advantageously is able to function properly at the elevated temperatures of the energy storage device 100 and wherein the heat losses from the SiC based electronic device are used to help maintain the energy storage device within its preferred operating temperature range, extending the battery life.

While the embodiments described above are particularly applicable to downhole conditions of increased temperature, embodiments of the present invention may also be used in various other situations. For example, the energy storage system may be used in a vehicle wherein heat losses from one or more other systems such as the braking system may be received within the thermal insulator 200 to provide heat energy to the energy storage device 100. Alternatively, an energy storage system may be used in a computer power supply with high temperature electronic components, such as SiC based electronics, which may be provided in the power supply or an associated computer system or both and in which heat losses from the electronics are used to provide heat energy to the energy storage device 100. As well as thermal batteries, other energy storage devices may be used, such as fuel cells.

If it is not practical to provide the one or more other components in the same thermal insulator as the energy storage device, a suitable heat transfer device may be provided between the two, such as a heat conducting cable or metal rod. A heat pump could be provided to assist the heat transfer. This would also help to cool the hot components/other devices.

Any suitable energy storage device arranged to operate above ambient temperature may be used, such as primary or secondary thermal batteries or fuel cells. Many variations may be made to the embodiments described above while still falling within the scope of the invention. For example, whilst two energy storage devices 100 are shown in the example of FIG. 3, any number of one or more energy storage devices 100 may be used as is suitable for its intended use.

What is claimed is:

1. An energy storage system comprising:
an energy storage device configured to operate above ambient temperature, wherein the energy storage system is configured to be used downhole; and
a thermal insulator at least partially surrounding the energy storage device;
a heater; and
one or more other devices positioned outside the thermal insulator,
wherein heat from the heater and waste heat losses from the one or more other devices are configured to be received within the thermal insulator to provide heat energy to the energy storage device, and
wherein if a temperature of the energy storage device falls below a threshold temperature, energy from the energy storage device is used to power the heater to increase the temperature above the threshold.

2. The energy storage system according to claim 1, wherein the one or more other devices comprise one or more electronic components.

3. The energy storage system according to claim 2, wherein the one or more electronic components are configured to operate in a temperature range that overlaps with the operating temperature range of the energy storage device.

4. The energy storage system according to claim 3, wherein the electronic components comprise SiC based components.

5. The energy storage system according to claim 2, wherein the electronic components comprise a power supply unit with at least one of the electronic components being at least partially surrounded by the thermal insulator and at least one of the electronic components being outside the thermal insulator.

6. The energy storage system according to claim 1, wherein the energy storage device comprises a thermal battery.

7. The energy storage system according to claim 6, wherein the energy storage device comprises a molten salt electrolyte battery.

8. The energy storage system according to claim 1, further comprises an electrical heater within the thermal insulator.

9. An energy storage system comprising:
an energy storage device configured to operate above ambient temperature;
a heater;
one or more other systems positioned outside the thermal insulator; and
a thermal insulator at least partially surrounding the energy storage device,
wherein the energy storage system is configured to be used in a vehicle, wherein heat from the heater and waste heat losses from the one or more other systems within the vehicle are configured to be received within the thermal insulator to provide heat energy to the energy storage device, and
wherein if a temperature of the energy storage device falls below a threshold temperature, energy from the energy storage device is used to power the heater to increase the temperature above the threshold.

10. The energy storage system according to claim 9, wherein a heat generating system of the one or more other systems comprises a braking system.

11. An energy storage system comprising:
an energy storage device configured to operate above ambient temperature, wherein the energy storage system is configured to be used in a computer power supply; and
a thermal insulator at least partially surrounding the energy storage device,
wherein heat from a heater and waste heat losses from associated electronic components outside the thermal insulator are configured to be received within the thermal insulator to provide heat energy to the energy storage device, and
wherein if a temperature of the energy storage device falls below a threshold temperature, energy from the energy storage device is used to power the heater to increase the temperature above the threshold.

12. The energy storage system according to claim 1, wherein the one or more other devices generate waste heat as an undesired by product of their primary purpose.

13. The energy storage system according to claim 12, wherein an amount of energy required from the energy storage device used to power the heater is reduced due to heat energy received by the energy storage device from the one or more other devices.

14. The energy storage system according to claim 1, wherein the one or more other devices are one or more of: electronic components, parts of a drilling system, and/or a breaking system.

15. The energy storage system according to claim 1, wherein the heat energy from the one or more other devices is provided in addition to heat from the heater.

16. The energy storage system according to claim 1, wherein the one or more other devices comprises an electronic circuit.

17. The energy storage system according to claim 1, wherein the one or more other devices is a power supply unit.

18. The energy storage system according to claim 1, wherein the thermal insulator only partially surrounds the energy storage device.

* * * * *